US010508780B2

(12) United States Patent
Moioli et al.

(10) Patent No.: US 10,508,780 B2
(45) Date of Patent: Dec. 17, 2019

(54) MODULAR LIGHTING SYSTEM

(71) Applicant: ARTEMIDE S.p.A., Milan (IT)

(72) Inventors: Daniele Moioli, Milan (IT); Andrea Gallucci, Guanzate (IT); Carlotta Francesca Isolina Maria De Bevilacqua, Milan (IT)

(73) Assignee: ARTEMIDE S.P.A. (IT)

( * ) Notice: Subject to any disclaimer, the term of this patent is extended or adjusted under 35 U.S.C. 154(b) by 0 days.

(21) Appl. No.: 15/944,852

(22) Filed: Apr. 4, 2018

(65) Prior Publication Data
US 2018/0292055 A1    Oct. 11, 2018

(30) Foreign Application Priority Data

Apr. 5, 2017    (IT) .................. 102017000037606

(51) Int. Cl.
| | |
|---|---|
| *F21V 23/06* | (2006.01) |
| *F21S 2/00* | (2016.01) |
| *F21V 21/005* | (2006.01) |
| *F21K 9/272* | (2016.01) |
| *F21K 9/275* | (2016.01) |
| *F16C 7/00* | (2006.01) |

(Continued)

(52) U.S. Cl.
CPC ............... *F21S 2/005* (2013.01); *F16C 7/00* (2013.01); *F21K 9/272* (2016.08); *F21K 9/275* (2016.08); *F21S 2/00* (2013.01); *F21V 21/005* (2013.01); *F21V 21/34* (2013.01); *F21V 23/06* (2013.01); *F21V 3/02* (2013.01); *F21V 3/0625* (2018.02); *F21Y 2103/10* (2016.08); *F21Y 2113/00* (2013.01); *F21Y 2115/10* (2016.08)

(58) Field of Classification Search
CPC .. F21S 2/005; F21S 2/00; F21K 9/272; F21K 9/275; F16C 7/00; F21V 21/34; F21V 21/06; F21V 3/02
See application file for complete search history.

(56) References Cited

U.S. PATENT DOCUMENTS 9,518,716 B1 * 12/2016 Householder ............. F21V 5/04
2003/0223235 A1    12/2003 Mohacsi et al.
(Continued)

FOREIGN PATENT DOCUMENTS

| | | |
|---|---|---|
| EP | 2696132 | 2/2014 |
| WO | 2014017068 | 1/2014 |
| WO | 2014045164 | 3/2014 |

OTHER PUBLICATIONS

Corresponding Italian Search Report for IT 201700037606 dated Nov. 24, 2017. IT.

*Primary Examiner* — Anabel Ton
(74) *Attorney, Agent, or Firm* — The Belles Group, P.C.

(57) ABSTRACT

A modular lighting system, comprising at least one module and auxiliary components which can be assembled together; the module comprising a support core, extending along an axis; a plurality of LEDs, arranged on at least one face of the core and axially spaced along the axis; a light body positioned in front of the LEDs and at least partly around the LEDs and having a lighting surface which transmits the light emitted by the LEDs to the surrounding environment; the modules and the auxiliary components are joined to each other by respective concealed mechanical and electrical connection devices, which are completely housed and concealed inside the modules and/or the auxiliary components.

14 Claims, 7 Drawing Sheets

(51) Int. Cl.
     *F21V 21/34*    (2006.01)
     *F21V 3/02*     (2006.01)
     *F21Y 103/10*   (2016.01)
     *F21Y 115/10*   (2016.01)
     *F21V 3/06*     (2018.01)
     *F21Y 113/00*   (2016.01)

(56)              References Cited

U.S. PATENT DOCUMENTS

2010/0008090 A1*  1/2010  Li .................. F21V 17/007
                                                      362/249.03
2012/0001554 A1   1/2012  Leadford et al.
2012/0008315 A1   1/2012  Simon et al.
2015/0267899 A1   9/2015  Baright
2016/0146445 A1*  5/2016  Shine ................ F21V 23/06
                                                      362/234

* cited by examiner

MODULAR LIGHTING SYSTEM

PRIORITY CLAIM

This application claims priority from Italian Patent Application No. 102017000037606 filed on Apr. 5, 2017, the disclosure of which is incorporated by reference.

TECHNICAL FIELD

The present invention relates to a modular lighting system.

BACKGROUND OF THE INVENTION

Modular lighting systems are known, comprising modules that can be combined together depending on the installation needs.

A common problem with known modular lighting systems is the electrical connection of the modules to each other. In known systems, the operation of connecting the modules together is not usually straightforward and requires complex operations and/or complicated and expensive components.

Moreover, in most cases, the connections between the modules are made using components that interrupt the continuity of the lighting fixtures and of the emitting surfaces, with results, which are aesthetically but also functionally unsatisfactory. In addition to being aesthetically unattractive, these interruptions also reduce lighting efficiency.

SUMMARY OF THE INVENTION

It is an object of the present invention to provide a modular lighting system which makes it possible to resolve the herein identified drawbacks of the prior art.

In particular, an object of the present invention is to provide a modular lighting system, which is easy to manufacture and assemble and makes it possible to obtain various designs with a high uniformity and efficiency of lighting, ensuring in particular lighting continuity even at the joints between the modules.

The present invention therefore relates to a modular lighting system as defined in the attached claim 1.

Further preferred characteristics of the invention are defined in the dependent claims.

With respect to systems of the prior art, the invention provides a simple and functional solution, which combines in particular a high homogeneity and uniformity of lighting and high efficiency and permits to obtain various shapes with fully satisfactory lighting effects.

In particular, the modular system of the invention ensures complete lighting continuity, even at the joints between different modules, avoiding the formation of shadows or differently lit areas.

In addition, the design of the modules making up the system makes possible extensive versatility in creating different spatial shapes.

BRIEF DESCRIPTION OF THE DRAWINGS

Further characteristics and advantages of the present invention will be apparent from the following description of a non-limiting example of an embodiment of it, with reference to the Figures of the attached drawings, wherein.

DETAILED DESCRIPTION OF THE INVENTION

Figure 1:
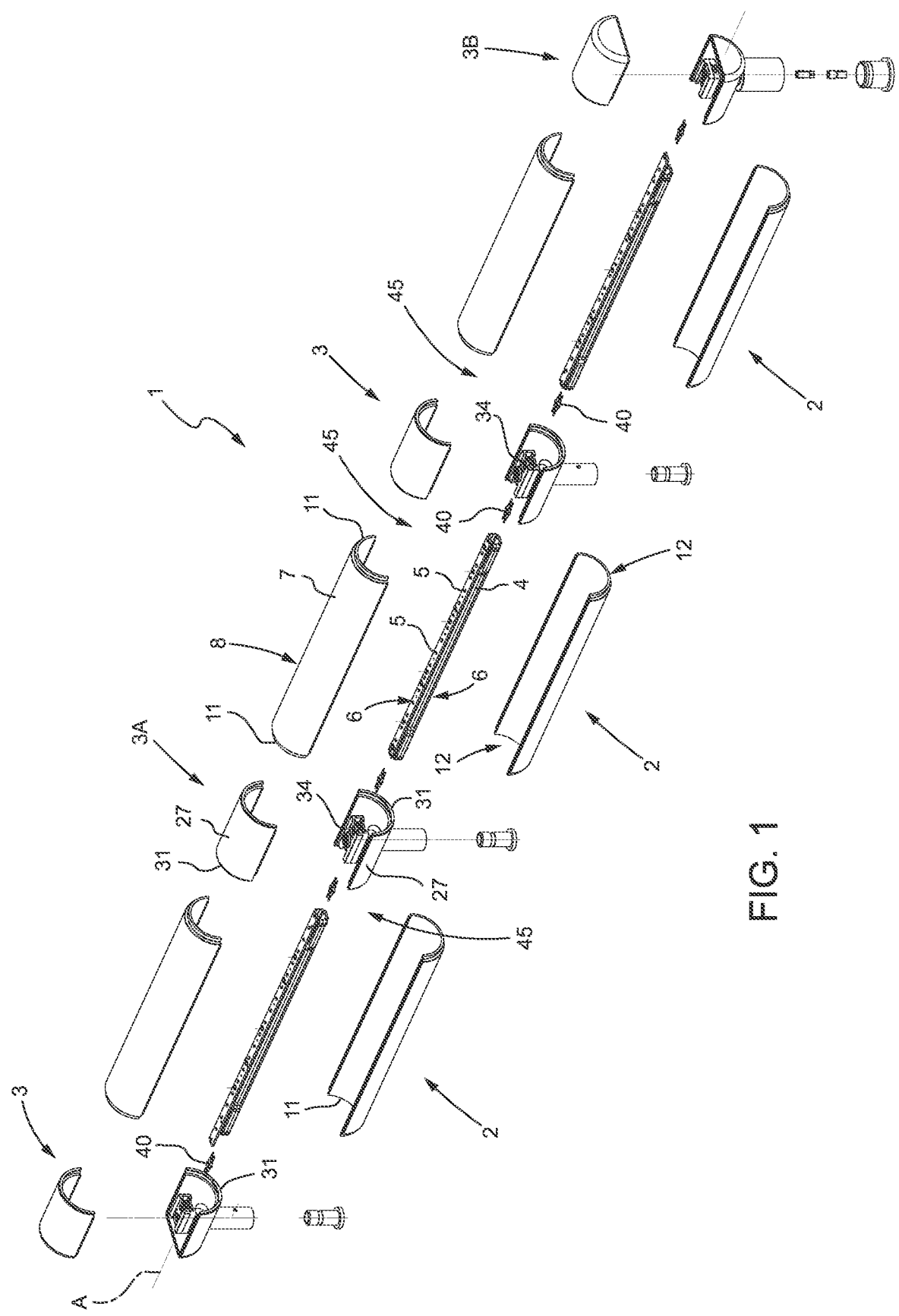
FIG. 1 is a schematic exploded perspective view of a modular lighting system in accordance with a first embodiment of the invention, in an illustrative layout.

In FIG. 1, reference number 1 designates in its entirety a modular lighting system, shown in an example layout.

The system 1 comprises a plurality of modules 2 and auxiliary components 3, which can be combined to form light fittings of different shapes and sizes.

The modules 2 may be the same or different.

For example, but not necessarily, the system 1 comprises linear modules 2 (such as those shown in FIG. 1) extending along a rectilinear axis A; the linear modules 2 may all be the same length, or the system 1 may include linear modules 2 of different lengths (and the same cross-section).

The system 1 may also include modules 2 of other shapes, for example curved modules in the shape of an arc of a circle and thus extending along a curvilinear axis; the system may also include curved modules with different radii of curvature. All the modules 2, however, have the same cross-section, for example essentially circular with a predetermined diameter.

By combining two or more linear and/or curved modules (possibly of different sizes, for example different lengths and/or radii of curvature), light fittings of different shapes and sizes can be formed.

Each module 2 comprises: a support core 4, extending along an axis A; a plurality of LEDs 5 (or other equivalent lighting sources), arranged on at least one face 6 of the core 4 and axially spaced along the axis A; a light body 7 positioned in front of the LEDs 5 and at least partly around the LEDs 5 and which has a lighting surface 8 which transmits the light emitted by the LEDs 5 to the surrounding environment.

In the example of FIG. 1, the core 4 supports two sets of LEDs 5 arranged on opposite faces 6 of the core 4.

The body 7 is in particular a substantially tubular hollow body, made of a material, which is at least partly light-permeable (for example, PMMA); the body 7 is preferably made of a diffusing material and thus defines a diffuser body of the module 2.

In the non-limiting example of FIG. 1, the body 7 comprises two half shells, made for example by moulding a suitable polymer material (for example, but not necessarily, PMMA) and joined along longitudinal lateral edges parallel to the axis A.

The lighting surface 8 is arranged around the axis A, being defined by an outer lateral surface of the body 7 and precisely of a lateral wall 9 of the body 7.

The body 7 has two coupling edges 11, arranged at respective axially opposite ends 12 of the module 2 (i.e. of the body 7).

Figure 2:
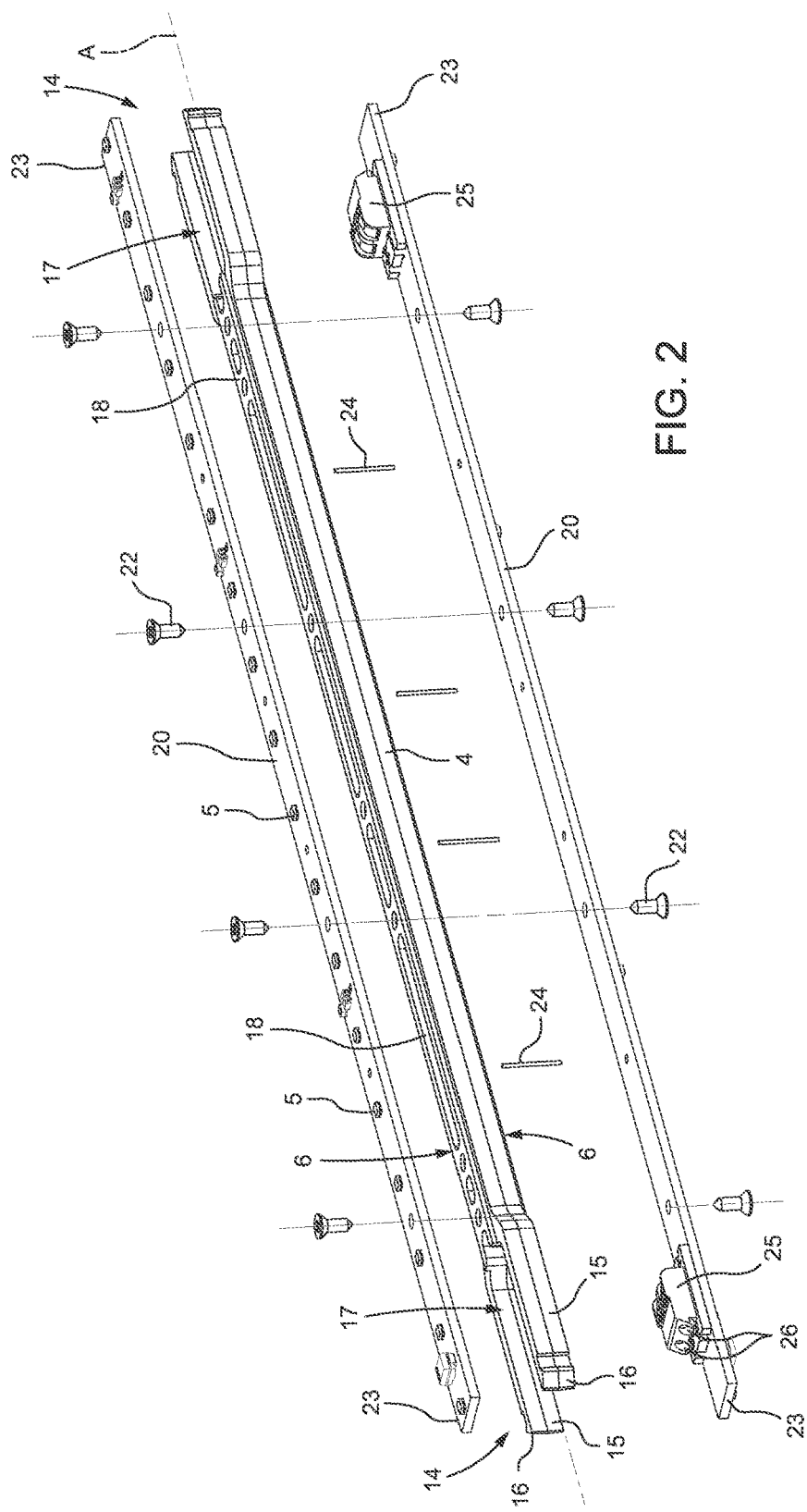
FIGS. 2, 3 and 4 are exploded views, in enlarged scale and with parts removed for clarity, of respective details of the modular lighting system of FIG. 1.

Also with reference to FIG. 2, the core 4 is bar-shaped and extends along the (rectilinear or curved) axis A between two axially opposite ends 14, provided with respective pairs of arms 15 facing each other.

The arms 15 are provided with respective coupling teeth 16 and delimit respective cavities 17 open towards the faces 6 and frontally along the axis A.

The core 4 is advantageously made of a heat conductive material (for example, aluminium), so as also to act as a heat sink for the LEDs 5. Advantageously, but not necessarily, the core 4 consists of an extruded aluminium bar.

Appropriately, the core 4 has through openings 18 which extend between the faces 6 and preferably extend along the axis A, in order to better dissipate the heat generated by the LEDs 5 and reduce the weight of the core 4.

Each series of LEDs 5 is carried by a board 20 shaped like an elongated strip and which also carries a printed circuit board which powers and controls the LEDs 5.

The boards 20 are attached to the core 4, for example, by screws 22 or other equivalent attachment means and extend between respective longitudinal ends 23 to cover the cavities 17.

The boards 20 with the respective circuits are electrically connected by conductive pins 24, made from electrically conductive material, which protrude transversally to the axis A between the boards 20, passing through the core 4 via the openings 18.

One of the boards 20 carries, at the opposing ends 23, two electrical connection terminals 25, which protrude from the board 18 towards the other board 20.

Each terminal 25 is arranged at one end 23 and is housed in a cavity 17 between the arms 15 and has a pair of front contacts 26 facing towards the respective end 23.

The auxiliary components 3 include one or more joints 3A, which connect the modules 2 to each another.

Figure 3:
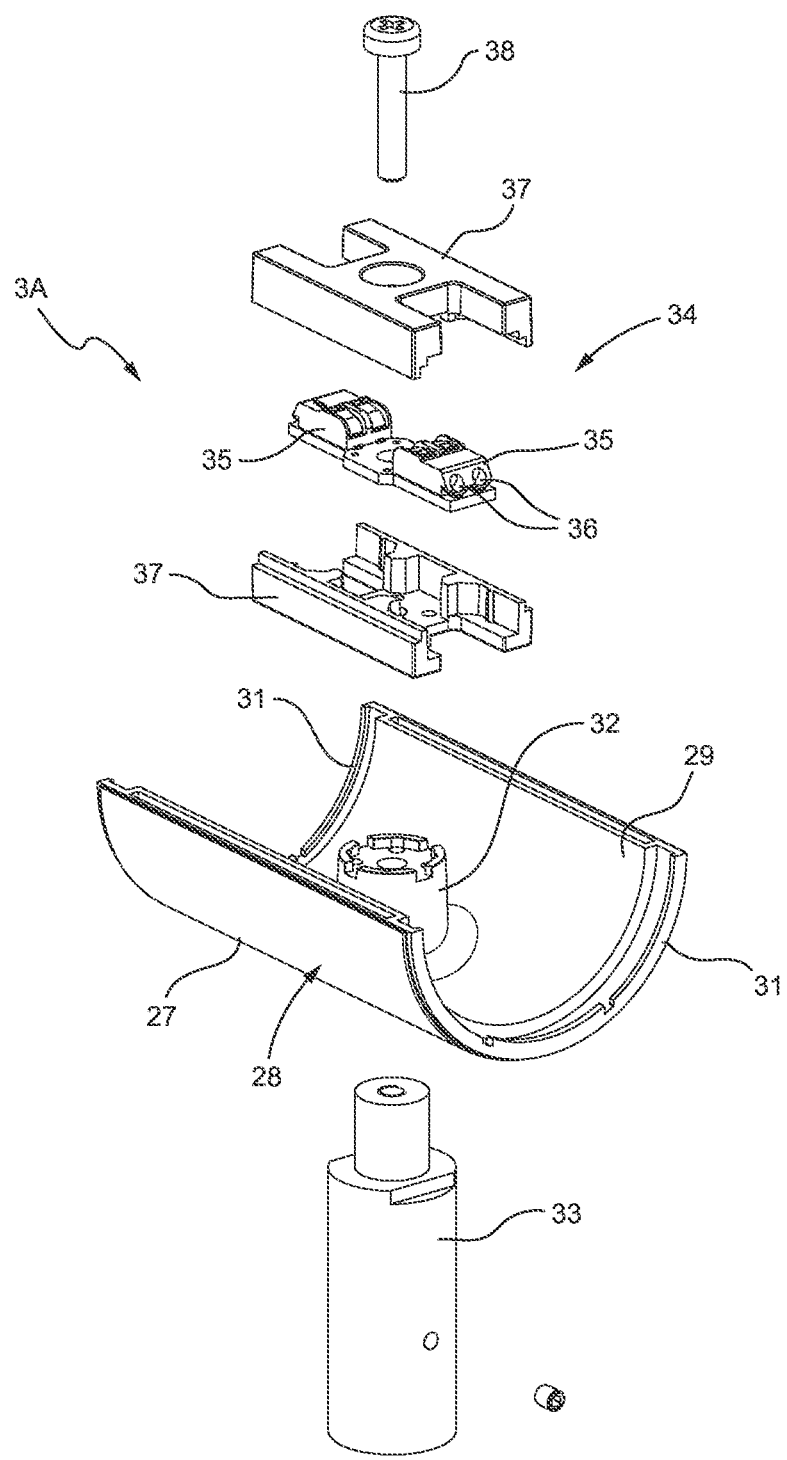

As shown in greater detail in FIG. 3, each joint 3A comprises a body 27 shaped so as to match with the light bodies 7 of the modules 2 and thus having the same external shape in cross-section as the light bodies 7 of the modules 2. In particular, the body 27 has an outer lateral surface, which has the same cross-sectional shape as the outer lateral surface of the bodies 7 of the modules 2.

Preferably, the body 27 is also made of a material, which is at least partially light-permeable, and preferably of a diffusing material, like the bodies 7 of the modules 2.

The body 27 further has a lighting surface 28 arranged around the axis A and defined by an outer lateral surface of a lateral wall 29 of the body 27.

Optionally, the body 27 also comprises two half shells (only one of which is shown in FIG. 3) joined along respective longitudinal side edges parallel to the axis A.

The body 27 has two coupling edges 31, arranged in this case along the axis A at respective axially opposite ends of the joint 3A and shaped to engage with each other, for example by snap coupling or bayonet coupling or other mechanical coupling, with the respective coupling edges 11 of the modules 2, to mechanically connect the modules 2 to the joint 3A.

The joint 3A comprises an internal support 32, which protrudes from the lateral wall 29 into the interior of the body 27 and has a formed seat passing through the lateral wall 29 and which receives a pin 33, intended to secure the system 1 to an external surface, for example a wall.

The support 32 supports, inside the body 27, a connection block 34 having two opposing electrical connection terminals aligned along the axis A and provided with respective pairs of contacts 36.

The terminals 35 are tightly enclosed between two casing shells 37.

The block 34 is held together and secured to the support 32, for example, by a screw 38.

The joint 3A connects two modules 2, mechanically by means of the coupling edges 31 coupled to the respective coupling edges 11 of the modules 2; and electrically, by means of two pins 40 which engage with the contacts 36 of the terminals 35 of the joint 3A and the contacts 26 of the terminals 25 of the two modules 2.

The pins 40, the terminals 25, 35 and all the internal components of the modules 2 and the joints 3A are entirely housed within the bodies 7, 27.

The auxiliary components 3 also include end caps 3B, which close the ends 12 of the modules 2, which are not connected to a joint 3A.

Figure 4:
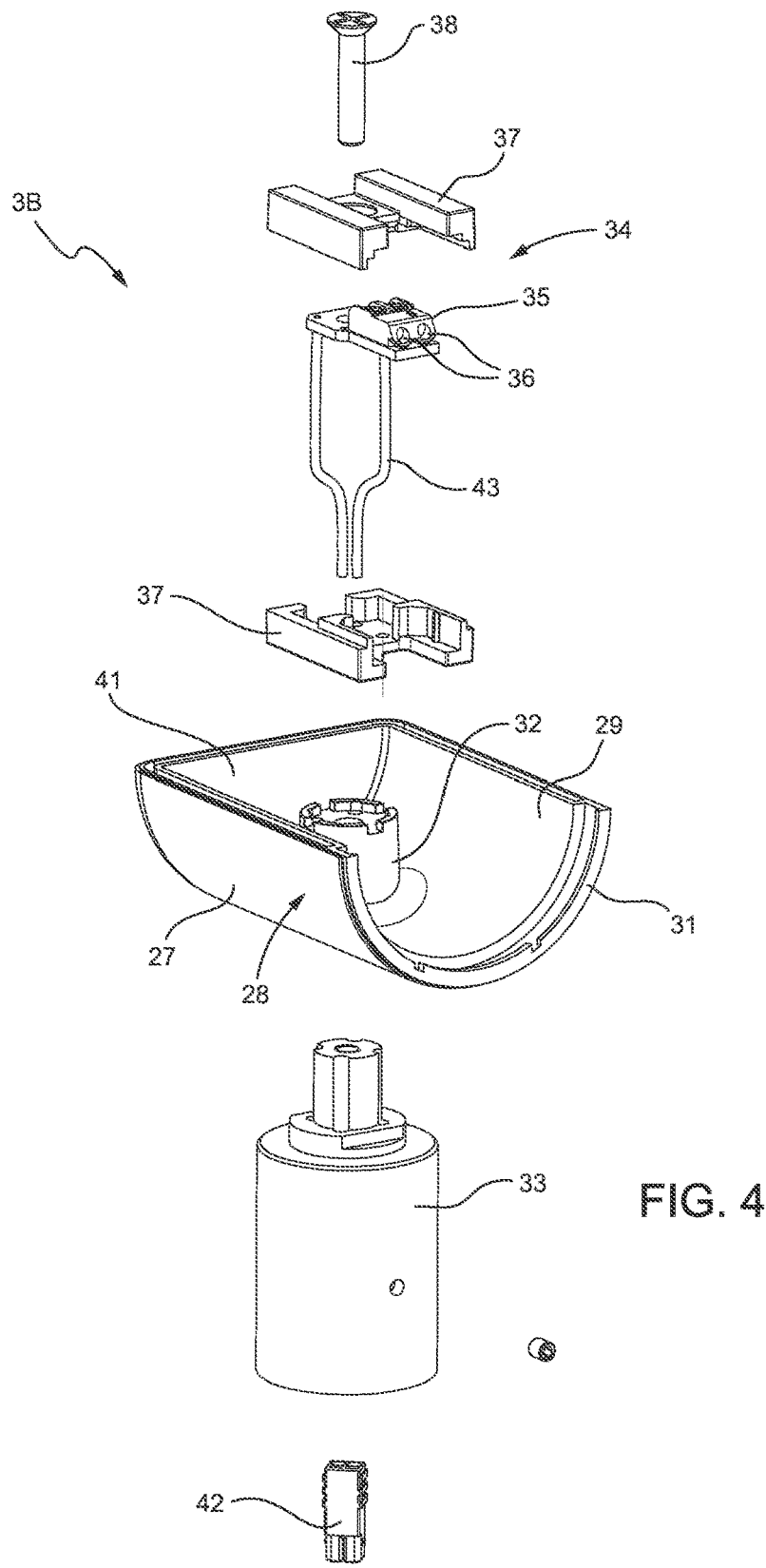

As shown in greater detail in FIG. 4, each cap 3B comprises, similarly to the joints 3A, a body 27, made of an at least partially light-permeable material and preferably of a diffusing material, shaped so as to connect with the bodies 7 of the modules 2 and therefore having the same cross-section as the bodies 7 of the modules 2 and, optionally, formed of two half shells (only one of which is shown in FIG. 4) joined along respective lateral edges.

The body 27 further has a lighting surface 28 arranged around the axis A and defined by an outer lateral surface of a lateral wall 29 of the body 27.

The body 27 extends along the axis A and has a coupling edge 31 at respective axially opposite ends, shaped so that it engages, for example by means of a snap coupling, with a coupling edge 11 of a module 2; and an end wall 41, which closes the body 27 at the rear.

Like the joint 3A, the cap 3B also comprises an internal support 32, which protrudes from the lateral wall 29 of the body 27 into the interior of the body 27 and has a formed seat passing through the lateral wall 29 and which receives a pin 33, intended to secure the system 1 to an external surface, for example a wall, and/or to power the system 1 via a connector 42.

The support 32 supports, inside the body 27, a connection block 34 having an electrical connection terminal 35 arranged along the axis A and provided with a pair of contacts 36.

The terminals 35 are tightly enclosed between two casing shells 37.

The block 34 is held together and secured to the support 32, for example, by a screw 38.

The terminal 35 is also connected, via a connection element 43, to the connector 42 accommodated in the pin 33.

The coupling edge 31 of the cap 3B mechanically engages with a coupling edge 11 of a module 2; the cap 3B is electrically connected to the module 2 by means of a pin 40, which engages the contacts 36 of the terminal 35 of the cap 3B and the contacts 26 of the terminal 25 of the module 2.

Here too, all the internal components of the modules 2 and the caps 3B are entirely housed inside the bodies 7, 27.

Thus, all the components which mechanically and electrically connect the modules 2 and the auxiliary components 3 to each other (in particular, the terminals 25, 35 and the respective contacts 26, 36, the pins 40, and the coupling edges 11, 31) are entirely housed and concealed inside the bodies 7, 27 and covered by the lighting surfaces 8, 28 of the modules 2 and/or of the auxiliary components 3.

These components thus define concealed mechanical and electrical connection devices 45, which are completely housed and concealed inside the modules 2 and/or the auxiliary components 3.

The devices 45 are concealed, in particular, by the lighting surfaces 8 of the modules 2 and of the auxiliary components 3, which are continuously connected to each other.

In addition to the joints 3A described above, which are linear couplings with coupling edges 31 and respective terminals 35 aligned along the axis A (and which thus serve to connect two modules 2 along the axis A), joints 3A of other types may also be provided, for example: L-shaped joints, having two coupling edges 31 and two terminals 35 arranged at right angles to each other; T-shaped joints, having three coupling edges 31 and three terminals 35 arranged at 90° to each other; and cross-shaped joints, having four coupling edges 31 and four terminals 35 arranged at 90° to each other.

Figure 5:
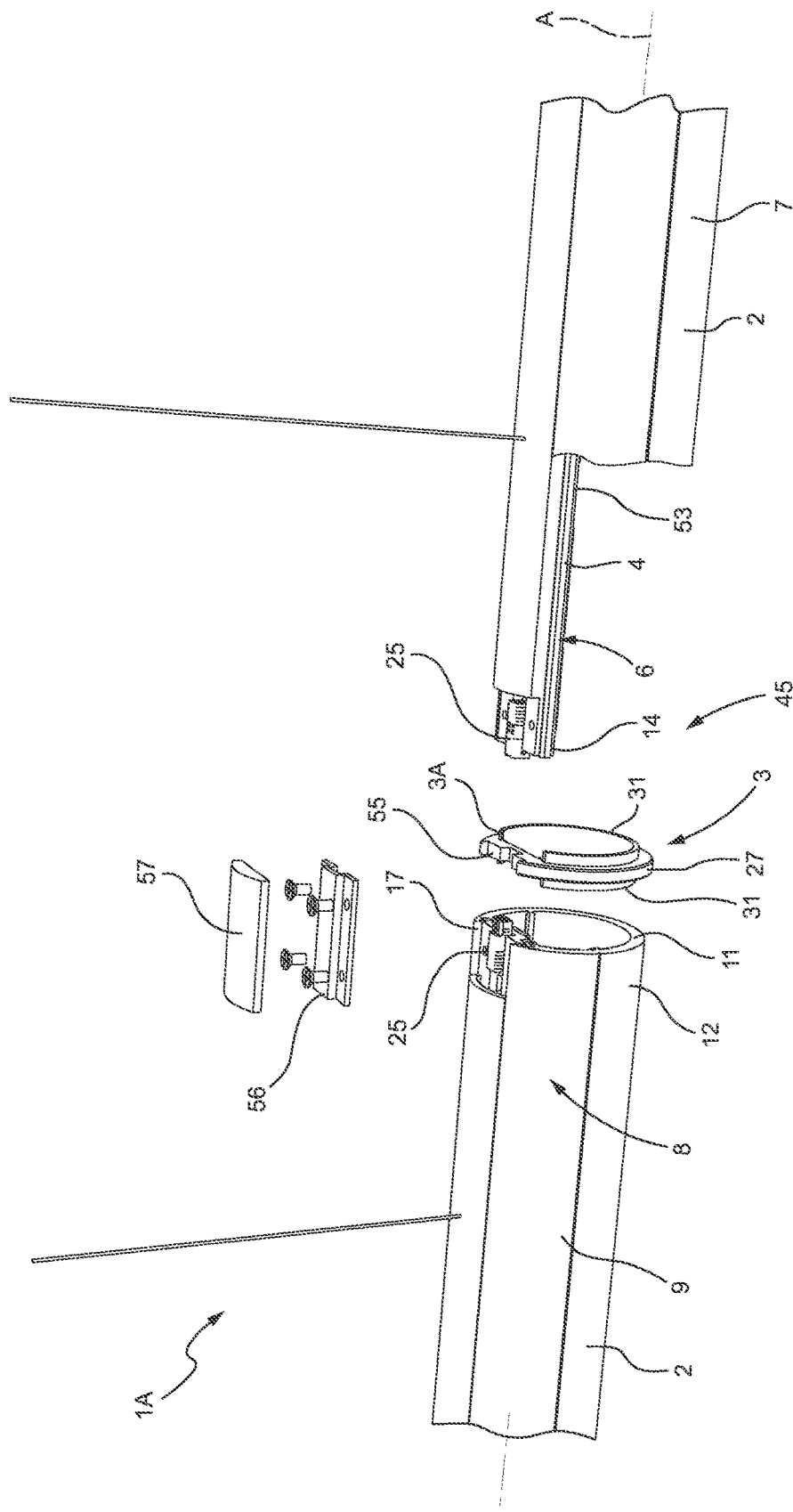
FIG. 5 is a partially exploded schematic perspective view of a part of a modular lighting system according to a second embodiment of the invention.
Figure 6:
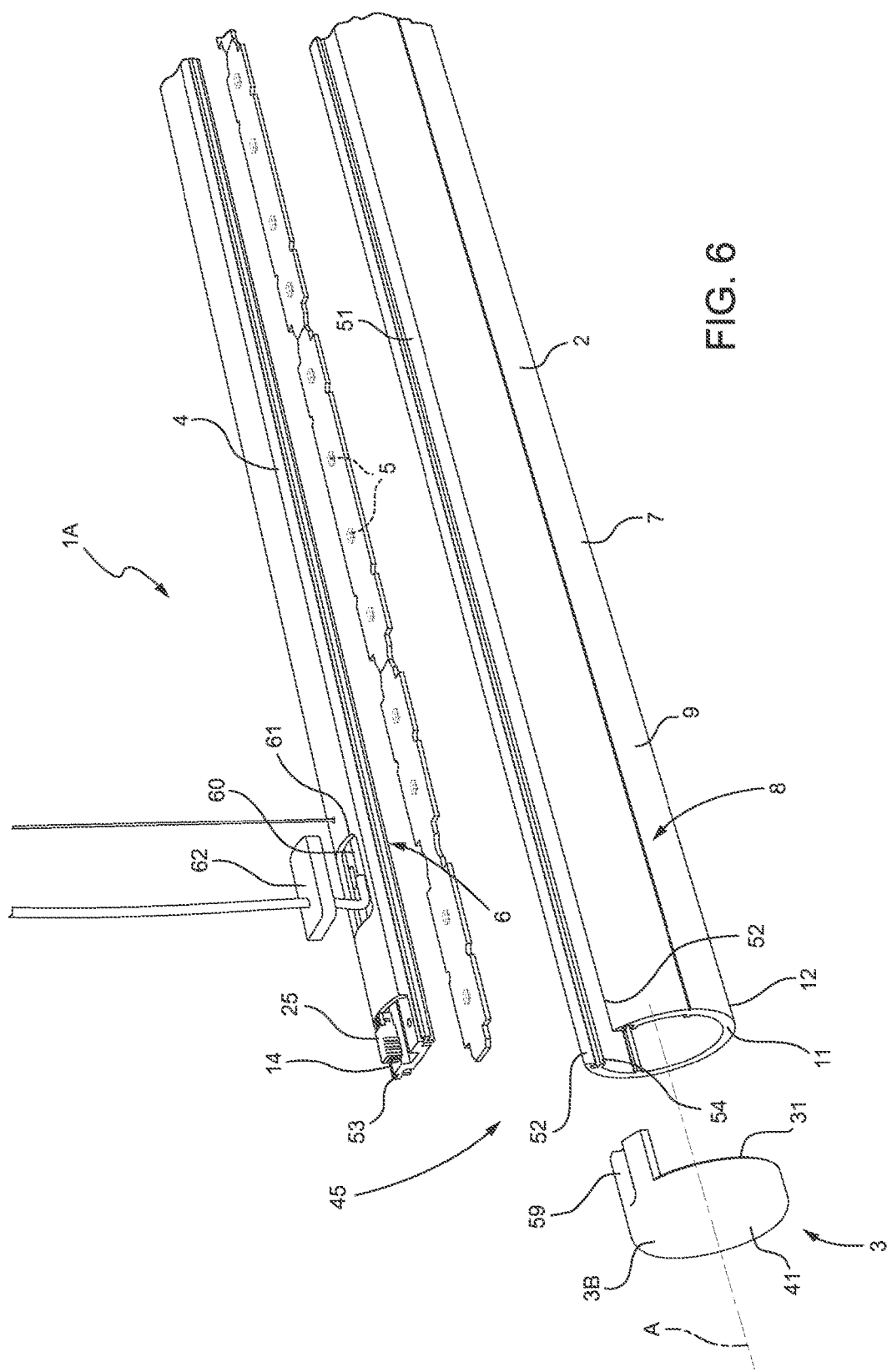
FIG. 6 is a partially exploded schematic partial perspective view of another part of the modular lighting system of FIG. 5.
Figure 7:
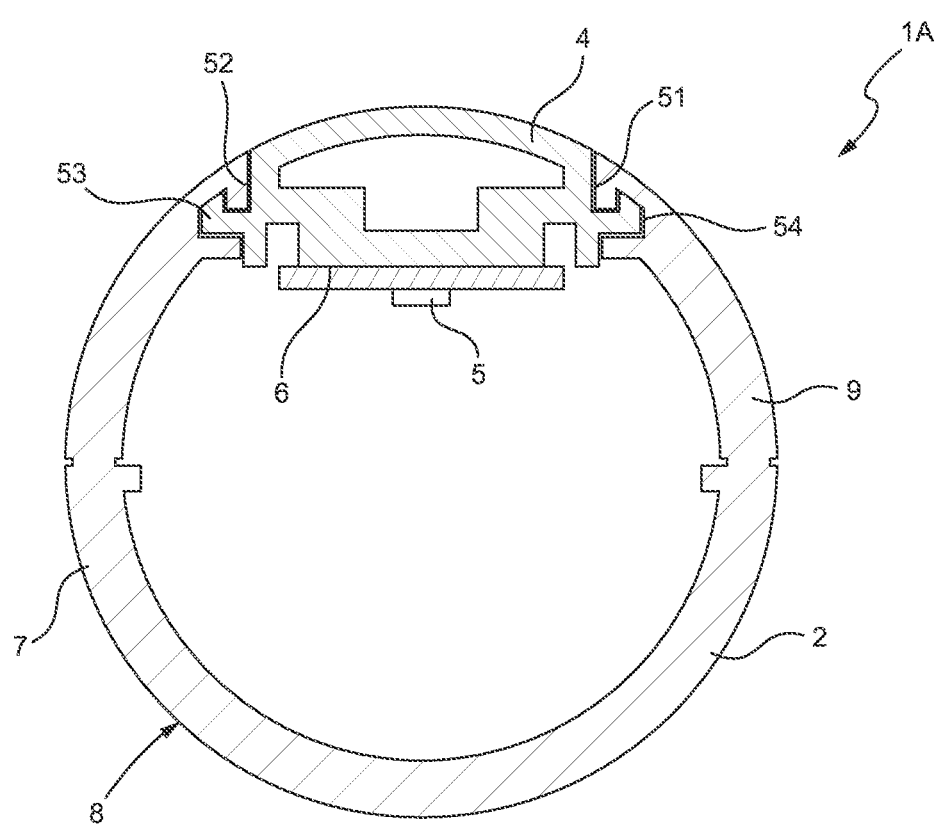
FIG. 7 is a cross-section view of a detail of the modular lighting system of FIG. 5.

In FIGS. 5-7, in which details similar to or the same as those already described are indicated with the same numbers, a modular lighting system 1a according to a different embodiment of the invention is shown, which is particularly (but not only) suitable for ceiling installation.

The system 1a again comprises a plurality of (identical or differently shaped) modules 2 and auxiliary components 3, in particular joints 3A and caps 3B.

Each module 2 comprises a support core 4, extending along the axis A; a plurality of LEDs 5 (or other equivalent lighting sources), arranged on at least one face 6 of the core 4 and axially spaced along the axis A; a light body 7 positioned in front of the LEDs 5 and at least partly around the LEDs 5 and having a lighting surface 8 which transmits the light emitted by the LEDs 5 to the surrounding environment and which is defined in particular by an external lateral surface of the wall 9 of the body 7.

In this case, the core 4 is positioned on a lateral wall 9 of the light body 7 and supports a series of LEDs 5 arranged on only one face 6, facing towards the inside of the body 7 of the core 4.

The body 7 is a substantially tubular hollow body, made of material which is at least partly light-permeable and preferably diffusing, so as to define a diffuser body of the module 2.

In greater detail, the light body 7 has a longitudinal slot 51, formed through the lateral wall 9 and parallel to the axis A and delimited by a pair of longitudinal side edges 52 facing each other.

The body 7 is advantageously, but not necessarily, an extruded polymer body, made of a polymeric material which is at least partially light-permeable and preferably diffusing (for example, but not necessarily, PMMA).

The core 4 has a pair of longitudinal side ribs 53, extending along the core 4 parallel to the axis A and engaging respective longitudinal grooves 54 formed on the lateral walls 9 of the body 7, precisely on respective longitudinal edges 52. Thus, the core 4 is mechanically supported by the body 7 and forms a portion of the side wall of the body 7.

Advantageously, but not necessarily, the core 4 also comprises an extruded aluminium bar (or a bar of a different heat conducting material) so as to act as a heat sink.

Here too, the body 7 has two coupling edges 11, arranged at respective axially opposite ends 12 of the module 2 (i.e. of the body 7) and associated with respective electrical connection terminals 25, supported by the core 4 to respective axially opposite ends 14 and connected to the board 20 that carries the LEDs 5.

Each terminal 25 is housed in a cavity 17 cut into the core 4 at the respective end 14.

Also in this embodiment, the auxiliary components 3 include joints 3A, which serve to connect the modules 2 to each other, and caps 3B, which serve to close the ends 12 of the modules 2, which are not joined to other modules 2.

Similarly to as described above, each joint 3A again comprises a body 27 shaped to connect with the bodies 7 of the modules 2; in particular, the body 27 has an outer lateral surface with the same cross-sectional shape as the outer lateral surface of the modules 2 of the bodies 7.

Preferably, the body 27 is also made of a material which is at least partially light-permeable and preferably of a diffusing material, like the bodies 7 of the modules 2.

The body 27 is essentially ring-shaped and has a pair of opposing annular coupling edges 31, which fit radially inside the respective coupling edges 11 of the modules 2; and an axially formed seat 55, which houses the ends 14 of the cores 4 of the modules 2 joined by the joint 3A.

The joint 3A also comprises a mechanical connection plate 56 which protrudes as a bridge between the adjacent ends 12 of the two modules 2 joined by the joint 3A and is secured, for example by screws, to the cores 4 of the two modules 2, above the terminals 25 which thus remain closed in the respective cavities 17. The plate 56 is preferably provided with a cover 57 which covers the plate 56 and is shaped so as to be connected to the respective outer surfaces of the cores 4.

Each cap 3B comprises, similarly to the joints 3A, a body 27, made of an at least partially light-permeable material and preferably of a diffusing material, shaped so as to connect with the bodies 7 of the modules 2 and therefore having the same external shape in cross-section as the bodies 7 of the modules 2.

In particular, the body 27 extends along the axis A and has a coupling edge 31 at respective axially opposite ends, shaped so that it engages a coupling edge 11 of a module 2; and an end wall 41, which closes the body 27 at the rear.

The body 27 further has a cover portion 59, which protrudes from the coupling edge 31 and is shaped to cover the terminal 25 arranged at the end 12 of the module 2 joined to the cap 3B and to be connected to the outer surface of the core 4 of the latter module 2.

For powering the system 1, at least one module 2 (for example the module 2 connected to the cap 3B) has a connector 60, accessible via a window 61 formed on the core 4 of the module 2 and closed by a removable cover 62 provided with a hole in which a power cord is inserted.

Finally, it is understood that the modular lighting system described and illustrated herein may be subject to modifications and variations without thereby departing from the protective scope of the attached claims.

The invention claimed is:
1. A modular lighting system comprising:
at least one module and auxiliary components which can be assembled together, the module comprising:
  a support core extending along an axis;
  a plurality of LEDs arranged on at least one face of the support core and axially spaced along the axis; and
  a light body positioned in front of the LEDs and at least partly around the LEDs;
wherein the modules and the auxiliary components are joined to one another by respective concealed mechanical and electrical connection devices, the connection devices being completely housed and concealed inside at least one of:
  the modules; or
  the auxiliary components; and
wherein the modules and the auxiliary components have respective lighting surfaces which transmit light emit- ted by the LEDs and which are continuously joined to one another and conceal the connection devices.

2. The system according to claim 1, wherein the light body is a substantially tubular hollow body, made of a diffusing material so as to define a diffuser body of the module.

3. The system according to claim 1, wherein the support core is made of a heat conductive material so as to also act as a heat sink for the LEDs.

4. The system according to claim 1, wherein each connection device comprises a pair of coupling edges carried respectively by a module and an auxiliary component and shaped so as to mechanically engage with each other.

5. The system according to claim 1, wherein each connection device comprises a pin which engages respective pairs of contacts of a module and, respectively, of an auxiliary component.

6. The system according to claim 1, wherein the connection devices comprise a pair of electrical connection terminals, positioned at respective opposite ends of the module and housed inside respective cavities formed on the support core.

7. The system according to one claim 1, wherein the support core is bar-shaped and extends along the axis between two opposite axial ends, provided with respective pairs of arms facing each other and having respective coupling teeth and which delimit respective cavities.

8. The system according to claim 1, wherein each auxiliary component comprises a body shaped so as to match with the light bodies of the modules and thus having the same external shape in cross-section as the light bodies of the modules, and wherein the body of the auxiliary component and the light bodies of the modules comprise coupling edges configured to mechanically engage each other.

9. The system according to claim 8, wherein the body of the auxiliary component has a lighting surface arranged around the axis and defined by an outer lateral surface of a lateral wall of said body of the auxiliary component.

10. The system according to claim 8, wherein the body of the auxiliary component is made of a diffusing material.

11. The system according to claim 1, wherein the auxiliary components include at least one of:
one or more joints, which connect the modules to one another; or
end caps, which close respective ends of the modules.

12. A modular lighting system comprising:
at least one module and auxiliary components which can be assembled together, the module comprising:
a support core extending along an axis, wherein the support core supports two series of LEDs arranged in an axially spaced apart manner and carried by respective boards extending parallel to the axis, the LEDs positioned on respective opposite faces of the support core, the boards being electrically connected by conductive pins extending crosswise to the axis between the boards and passing through openings formed through the support core; and
a light body positioned in front of the LEDs and at least partly around the LEDs and having a lighting surface which transmits light emitted by the LEDs;
wherein the modules and the auxiliary components are joined to one another by respective concealed mechanical and electrical connection devices, the connection devices being completely housed and concealed inside at least one of:
the modules; or
the auxiliary components.

13. A modular lighting system comprising:
at least one module and auxiliary components which can be assembled together, the module comprising:
a support core extending along an axis;
a plurality of LEDs arranged on the support core and axially spaced along the axis; and
a light body positioned in front of the LEDs and at least partly around the LEDs and having a lighting surface which transmits light emitted by the LEDs;
wherein the modules and the auxiliary components are joined to one another by respective concealed mechanical and electrical connection devices, the connection devices being completely housed and concealed inside at least one of:
the modules; or
the auxiliary components; and
wherein the support core is positioned on a lateral wall of the light body of the module and supports a series of the plurality of LEDs arranged on only one face, facing towards the inside of the light body of the support core.

14. The system according to claim 13, wherein the light body of the module has a longitudinal slot, formed through the lateral wall and parallel to the axis and delimited by a pair of longitudinal side edges facing each other, and wherein the support core has a pair of longitudinal side ribs, extending along the support core parallel to the axis and engaging respective longitudinal grooves formed on respective longitudinal side edges of the slot.

* * * * *